May 21, 1935.  R. L. GURLEY  2,002,059
PLOW
Filed Feb. 13, 1934  2 Sheets-Sheet 2
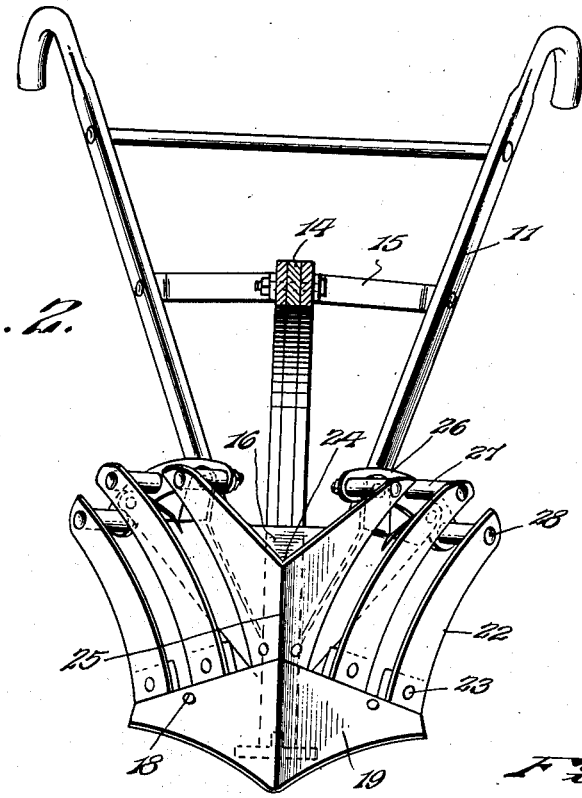

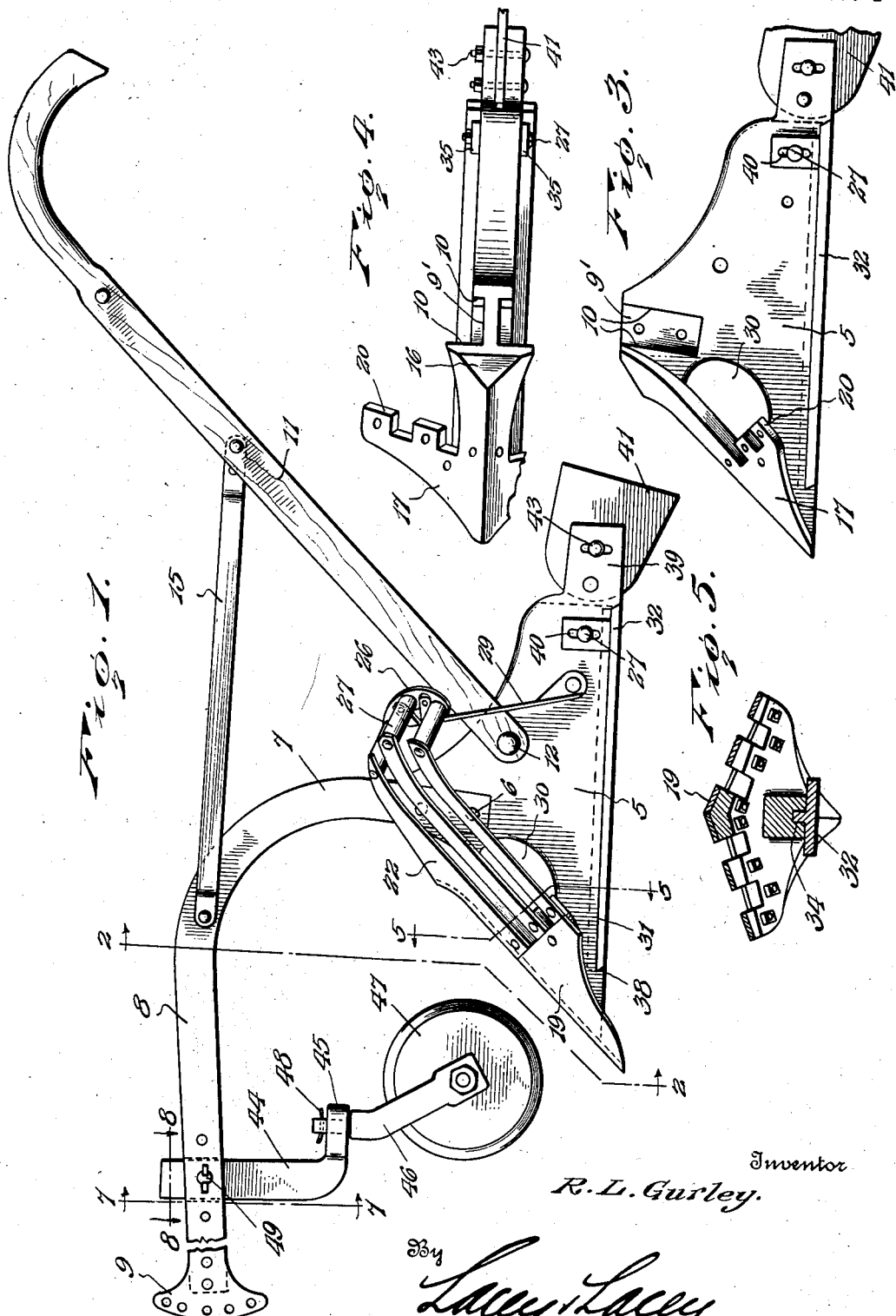

Patented May 21, 1935

2,002,059

UNITED STATES PATENT OFFICE 2,002,059

PLOW

Robert L. Gurley, Oakfield, Tenn., assignor of one-half to Charlie M. Dees, Oakfield, Tenn.

Application February 13, 1934, Serial No. 711,041

3 Claims. (Cl. 97—123)

This invention relates to agricultural implements and more particularly to a novel form of plow specially designed for working in clay soil and for bedding said soil.

The object of the invention is to provide a plow of simple, durable and efficient construction which will not choke or clog and is easy to handle and requires less power to operate than plows now in general use.

A further object is to provide a plow that will evenly divide the soil and turn said soil laterally on each side of the plow point so as to make beds of uniform height.

A further object is to provide a plow having spaced guide fingers projecting rearwardly and upwardly from the plow point and defining air spaces so as to reduce suction and positively prevent trash and heavy soil, such as clay, from adhering to said guide fingers during the plowing operation.

A still further object of the invention is generally to improve this class of devices so as to increase their utility, durability and efficiency.

Further objects and advantages will appear in the course of the following specification, in which Figure 1 is a side elevation of a plow embodying the present invention.

Figure 2 is a transverse sectional view taken on the line 2—2 of Figure 1.

Figure 3 is an enlarged side elevation of the foundation block or runner.

Figure 4 is a top plan view of Figure 3.

Figure 5 is a transverse sectional view taken on the line 5—5 of Figure 1.

Figure 6 is an enlarged detail perspective view of the runner block detached showing the runner plate immediately below the same and in position to fit in the bottom of the runner block.

Figure 7 is a vertical sectional view taken on the line 7—7 of Figure 1.

Figure 8 is a horizontal sectional view taken on the line 8—8 of Figure 1.

The improved plow, forming the subject-matter of the present invention, comprises a runner block 5 to which is bolted or otherwise rigidly secured at 6 the stock 7 of a plow beam 8, the latter being of any approved construction and terminating in a clevis 9 to which may be attached draft animals or a farm tractor in the usual manner.

The upper portion of the block 5 is substantially I-shaped in cross section to provide oppositely disposed seating recesses 9' adapted to receive the stock 7 and defining stop shoulders 10 against which the stock bears so as to prevent lateral displacement of said stock with reference to the block. Extending rearwardly from the block 5 are handles 11 having their lower ends connected with the rear portion of the block 5 by a bolt or similar fastening device 12, there being a series of openings 13 formed in the block so that by inserting the bolt in any one of the openings 13 the inclination of the handles 11, with respect to the block, may be adjusted at will thereby to vary the depth of cut of the plow. The plow beam 8 is preferably formed of spaced bars between which is interposed a filler strip 14 and extending between the side bars of the plow beam and the handles 11 are braces 15 which are also adjustable, as shown, to accommodate the inclination of the handles.

The front of the block 5 is inclined downwardly and the upper end thereof beveled in the direction of the stock, as indicated at 16, said block being provided with oppositely disposed attaching wings 17 to which is secured, by bolts or other fastening devices 18, a plow point 19. The upper ends of the wings 17 are provided with spaced attaching lugs 20 having openings 21 formed therein, as best shown in Figure 6 of the drawings. Secured to the lugs 20 of the attaching wings 17 are spaced rearwardly and upwardly curved guide fingers 22, the lower ends of which are seated on the lugs 20 and are rigidly secured thereto by bolts or other fastening devices 23 extending through the openings 21, as shown. The thickness of the attaching ends of the guide fingers is preferably the same as the thickness of the metal constituting the plow point so that when the fingers are secured to the attaching lugs 20, the upper surfaces of the fingers will lie flush with the upper surface of the plow point and thus not offer any projection or obstruction on which the soil may catch during the plowing operation.

The central guide finger 22 is wider than the remaining guide fingers and has its upper end at the bevel 16 bifurcated at 24 to accommodate the stock 7 and permit the portions defined by the bifurcation to extend on opposite sides of the stock, as best shown in Figure 1 of the drawings. The central guide finger is also formed with a vertical ridge 25 disposed in alinement with the ridge of the plow point 19 so that the soil coming in contact with said ridge will be deflected either to the right or left thereof. The upper or free ends of the guide fingers are connected by arcuate plates 26 and interposed between said plates and the adjacent fingers are spacing cylinders or sleeves 27 through which extend attaching bolts 28. The guide fingers are further reinforced and strengthened by the provision of braces 29 having their lower ends secured to the block 5 and their upper ends forked or bifurcated and secured to the adjacent plates 26. Inasmuch as the guide fingers 22 are spaced apart they provide intermediate air spaces which reduces suction and lessens the likelihood of trash and heavy soil, such as clay, from adhering to said fingers during the plowing operation.

The block 5 is preferably formed at its forward portion with an opening 30 so as to permit easy access to the bolts or other fastening devices for both the guide fingers and plow point. The lower longitudinal edge of the block 5 is cut away to form a seat 31 adapted to receive a runner plate 32, said plate having an upstanding guide rib 33 which fits in a correspondingly shaped groove or channel 34 in the bottom of the seat 31, said runner plate being provided with upstanding ears 35 having vertical slots 36 therein and through which extends an attaching bolt 37 whereby to permit the runner plate to be adjusted with respect to the block. The forward end of the seat 31 is preferably undercut at 38 and the forward end of the runner plate is correspondingly shaped, so as to assist in preventing displacement of said runner plate. Projecting laterally from the rear of the block 5 is an extension 39 having a vertical slot 42 formed therein to receive a rear cutter blade 41. The side walls of the extension 39 are slotted at 40 to receive a bolt 43 by means of which the cutter blade 41 may be adjusted to any desired depth and securely held in adjusted position.

Arranged at the front of the plow is a forward cutting member comprising a shank 44, the upper end of which is interposed between the side bars constituting the beam 3 and in order to accommodate said shank a portion of the filler is cut away, as best shown in Figure 8 of the drawings. The lower end of the shank is provided with a lateral head 45 in which is swiveled a fork 46 carrying a rotary cutting disk 47, said fork being retained in position on the head 45 by a cotter pin 48, or in any other suitable manner. A securing bolt 49 extends through the beam 3 and engages the shank 44 so as to permit the cutting disk 47 to be raised or lowered and securely held in adjusted position.

It will be noted that the cutting disk 47 is disposed in alinement with the central ridge of the plow point so that as the point passes through the soil the cutter will evenly divide the soil and cause it to pass upwardly and rearwardly on opposite sides of the central ridge of the plow point thereby insuring beds of even height. As the plow moves forwardly the rear cutter 41 will likewise cut or sever the soil and this rear blade 41 also serves as a guide and assists in holding the plow point in the ground.

It is a well-known fact that when plowing in heavy soil, such as wet clay, said clay has a tendency to adhere to the plow share and by forming the point of my plow with spaced rearwardly extending fingers, intermediate air spaces are produced which tend to prevent suction and cause the soil to be thrown laterally and evenly to both the right and left of the plow point as the plow travels over a field or other enclosure.

A plow constructed in accordance with the present invention not only divides the land and insures uniform bedding but cuts deeper into clay soil and thus makes sub-soiling easier.

From the foregoing description, it is thought that the construction and operation of the device will be readily understood by those skilled in the art and further description thereof is deemed unnecessary.

It will be understood that the wings 17 may be made longer, if desired, that is to say, may extend up higher at the front of the stock to form a more rigid structure and in which event the guide fingers will be made correspondingly shorter. The lugs 20 may also be omitted, if desired, and the guide fingers attached directly to the upper portion of the wings.

It will also be understood that the plows may be made in different sizes and shapes and constructed of any suitable material without departing from the spirit of the invention.

Having thus described the invention, I claim:

1. A plow comprising a block having a slotted extension at the rear thereof and provided in its lower face with a longitudinal seat and a groove rising from the seat, a runner plate fitted in the seat, said plate having a rib fitting into the groove and adjacent its rear end having upwardly extending slotted ears fitting against side faces of the block, a fastener passing through the block and slots of the ears to secure the runner and permit vertical adjustment thereof, a plow beam connected with the block, attaching wings extending laterally from the front end of the block, a plow point secured to the attaching wings, spaced fingers extending rearwardly from the attaching wings and defining intermediate air passages, a cutter blade fitted in the slot of the extension and extending rearwardly from the block, and a fastening device extending through the extension and cutter blade for holding the blade in a vertically adjusted position.

2. A plow comprising block, wings extending laterally from the block and provided with spaced attaching lugs extending upwardly from the upper edges, a plow point secured to the attaching wings with its upper edge terminating at lower ends of the lugs, spaced guide fingers secured to the attaching lugs at the rear of the point and having their lower ends resting against the upper edge face of the point, fasteners passing through the fingers and lugs, there being an opening formed in the block adjacent said wings whereby ready access may be had to the fasteners, and a plow beam secured to the block.

3. A plow comprising a block having a portion thereof I-shaped in cross section and defining seats at opposite sides of the block having vertically extending marginal walls constituting stop shoulders, a plow beam including a stock having its lower end straddling the I-shaped portion of the block and fitting into the seats and bearing against the stop shoulders, handles disposed on opposite sides of the block, a bolt extending through the lower ends of the handles and through the block to connect the handles with the block, braces forming a connection between the plow beam and handles, and a plow point secured to the front end of the block.

ROBERT L. GURLEY. [L. S.]